United States Patent
Killion et al.

[11] Patent Number: 6,009,311
[45] Date of Patent: Dec. 28, 1999

[54] METHOD AND APPARATUS FOR REDUCING AUDIO INTERFERENCE FROM CELLULAR TELEPHONE TRANSMISSIONS

[75] Inventors: Mead C. Killion, Elk Grove Village, Ill.; Norman P. Matzen, Campbell, Calif.

[73] Assignee: Etymotic Research, Elk Grove Village, Ill.

[21] Appl. No.: 08/604,684

[22] Filed: Feb. 21, 1996

[51] Int. Cl.⁶ ........................... H04B 1/10
[52] U.S. Cl. .................. 455/63; 455/106; 455/300; 379/52; 381/23.1
[58] Field of Search ............... 455/296, 456, 455/575, 90, 95, 106, 300, 280–281; 379/52; 381/23.1, 25, 60, 68, 68.6, 68.2, 68.4, 69–69.2; 29/896.21; 600/25; 181/126; 73/585, 645; 330/65; D24/174; 342/42–51

[56] References Cited

U.S. PATENT DOCUMENTS

| | | | |
|---|---|---|---|
| 4,220,830 | 9/1980 | Schafer | 179/107 |
| 4,415,770 | 11/1983 | Kai et al. | 179/2 EB |
| 4,461,025 | 7/1984 | Franklin | 381/56 |
| 4,491,980 | 1/1985 | Ichikawa | 455/344 |
| 5,069,210 | 12/1991 | Jeutter et al. | 128/420.6 |
| 5,239,541 | 8/1993 | Murai | 370/77 |
| 5,276,910 | 1/1994 | Buchele | 455/41 |
| 5,289,543 | 2/1994 | Leibman | 381/7 |
| 5,289,544 | 2/1994 | Franklin | 381/68 |
| 5,412,734 | 5/1995 | Thomasson | 351/83 |
| 5,425,104 | 6/1995 | Shennib | 381/68 |
| 5,479,522 | 12/1995 | Lindemann et al. | 381/68.2 |
| 5,615,229 | 3/1997 | Sharma et al. | 375/259 |
| 5,619,580 | 4/1997 | Hansen | 381/68.2 |
| 5,621,802 | 4/1997 | Harjani et al. | 381/68.2 |
| 5,640,457 | 6/1997 | Gnecco et al. | 381/69 |
| 5,721,783 | 2/1998 | Anderson | 381/68.6 |

*Primary Examiner*—Vu Le
*Attorney, Agent, or Firm*—McAndrews, Held & Malloy, Ltd.

[57] ABSTRACT

Apparatus and method for reducing the interference of digital cellular telephones with hearing aids. A digital cellular phone is provided with a second antenna that transmits a local, low-power signal which fills in the gaps in the transmitted switched information carrier. This prevents the hearing aid from demodulating the low frequency switched carrier components of the digital cellular phone. Alternatively, the main antenna can transmit on a garbage frequency between time slots, or the hearing aid can detect and cancel the interfering signal.

3 Claims, 7 Drawing Sheets

FIG. 2
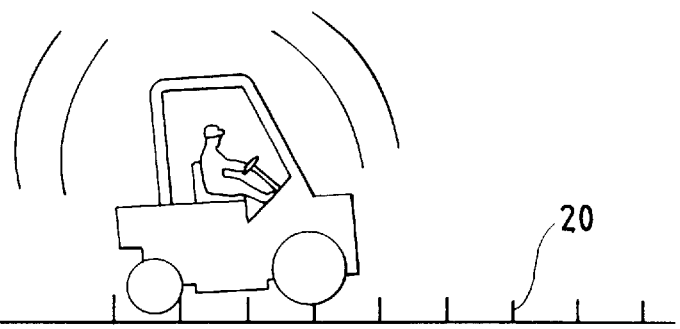
GSM: 217 SPIKES/SEC
8 USERS PER CARRIER
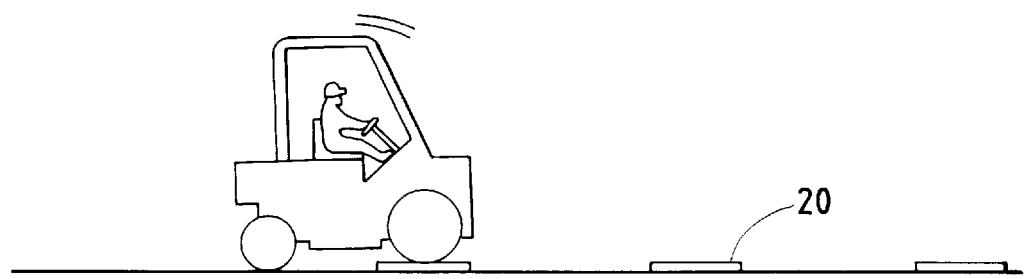
TDMA: 50 BUMPS/SEC
3-6 USERS PER CARRIER
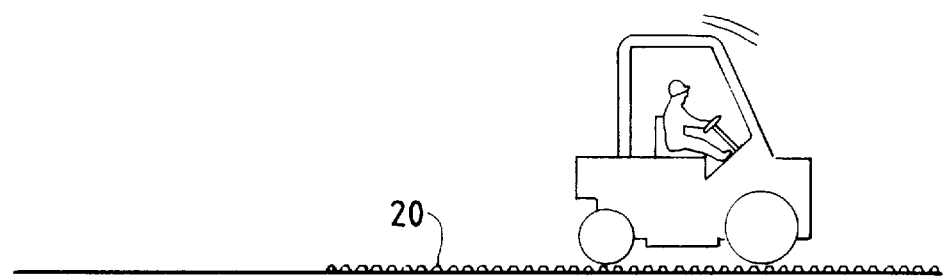
CDMA: 400 BUMPS/SEC WORST CASE PICKET FENCE
16-32 USERS PER CARRIER

FIG. 3
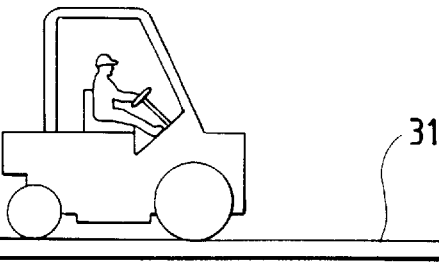
GSM: 217 SPIKES/SEC
8 USERS PER CARRIER
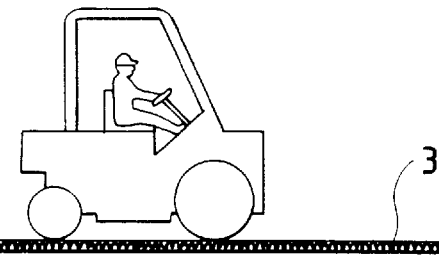
TDMA: 50 BUMPS/SEC
3-6 USERS PER CARRIER
CDMA: 400 BUMPS/SEC WORST CASE PICKET FENCE
16-32 USERS PER CARRIER

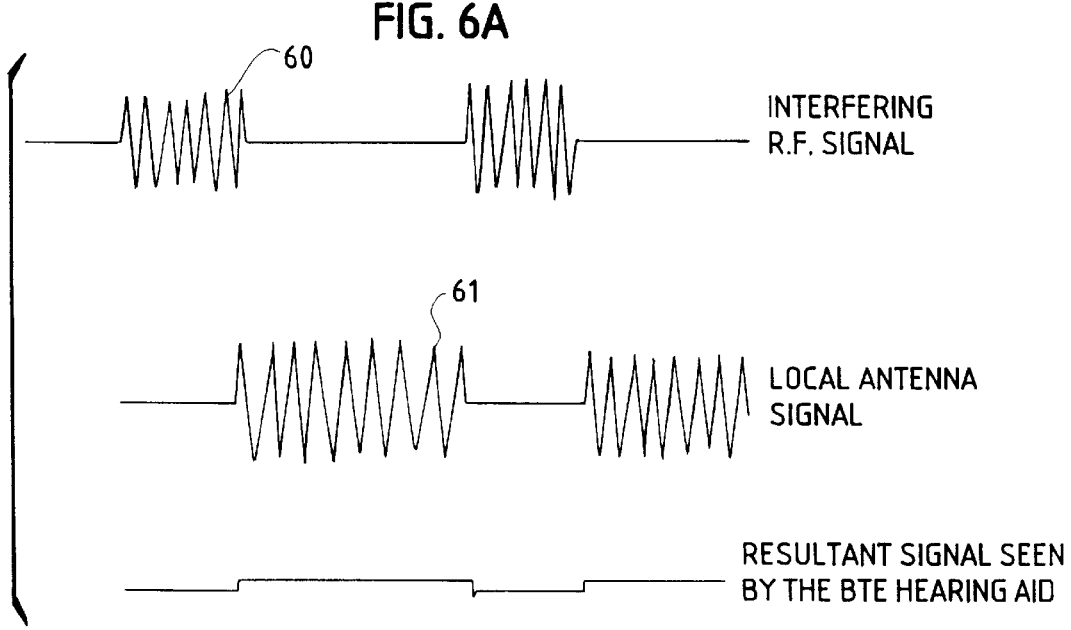
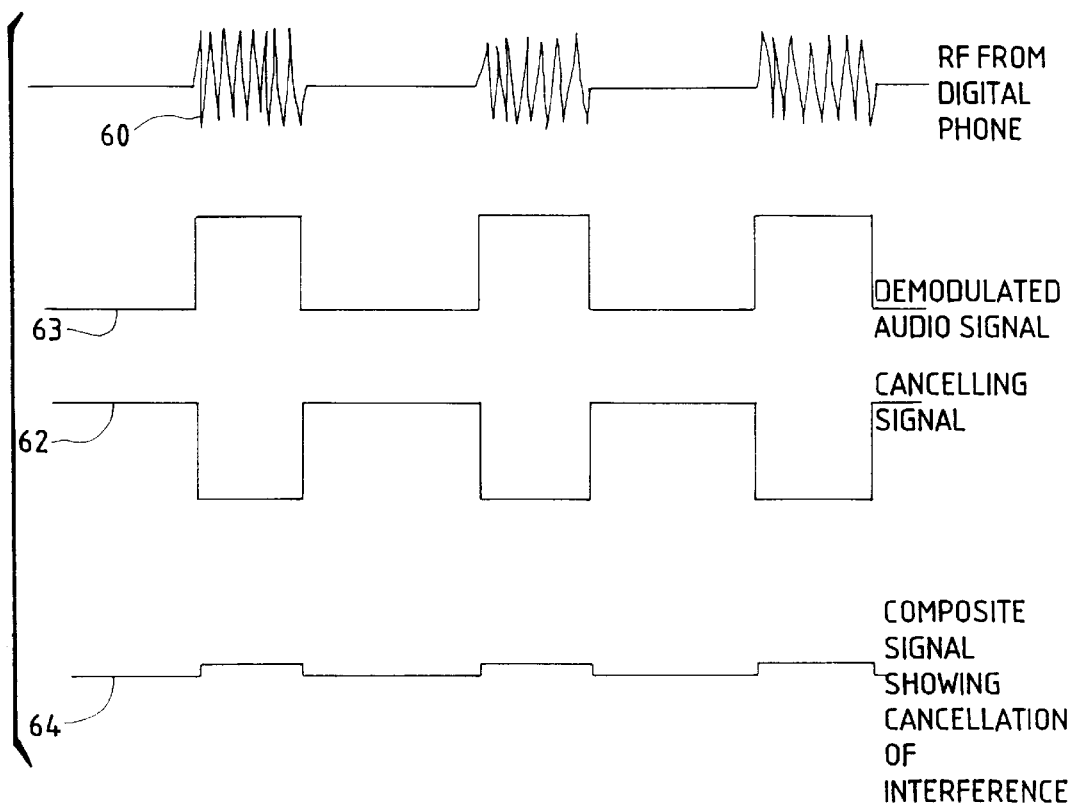

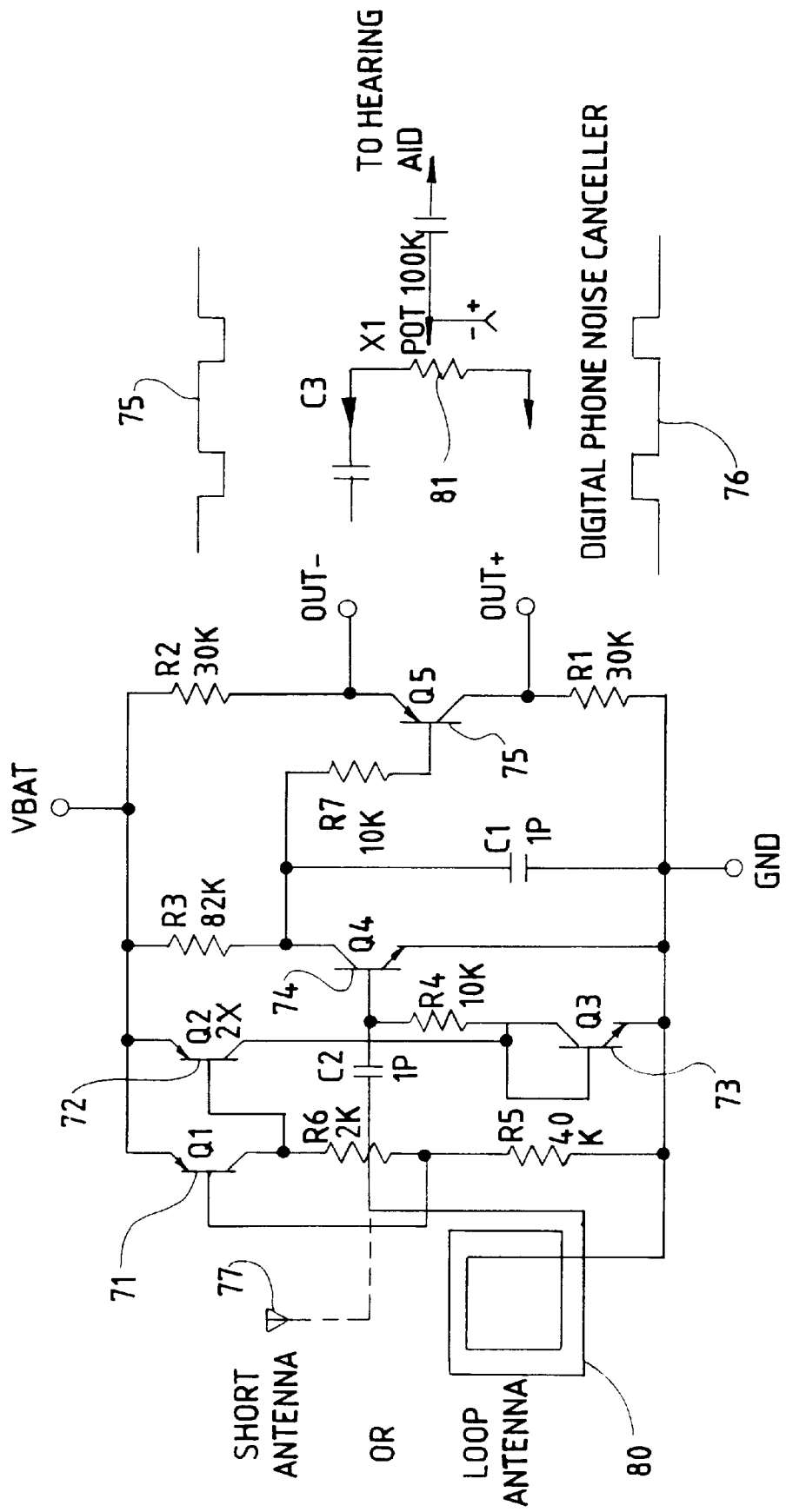

METHOD AND APPARATUS FOR REDUCING AUDIO INTERFERENCE FROM CELLULAR TELEPHONE TRANSMISSIONS

FIELD OF THE INVENTION

This invention relates to the field of reducing interference from digital cellular telephones. Specifically, methods of mitigating the effects of interference from a cellular telephone on hearing aids are disclosed.

BACKGROUND

For years, hearing impaired persons have struggled to obtain equipment from telephone service providers that is compatible with standard hearing aid devices. A well known result of this effort is the "tele-coil", a magnetic field enhancing device in all public telephones in the United States that allows many hearing aid amplifiers to directly couple to the output of a standard telephone handset. Until recently, devices like the tele-coil provided good compatibility for the hearing impaired with the public telephone network.

Recently, however, it has become apparent that the current generation of digital cellular telephones, if not modified, will cause tremendous problems for the hearing impaired. Cellular telephones generally operate in the 0.8 to 2.0 GHz frequency region. Analog cellular telephones have not caused any interference with hearing aids. Existing digital cellular telephones, however, use a switched carrier that cycles on and off at a frequency of 50 Hz (USDC) or 217 Hz (GSM). The switched carrier is used because USDC and GSM phones use a Time Division Multiple Access (TDMA) technique that allows 3 to 8 users to share the same frequency. The high frequency carrier has a relatively high energy when held next to a hearing aid users ear and is demodulated by the natural geometry of nearly every hearing aid on the market.

As described by Preves and by Arndt at the Hearing Aid Compatibility and Accessibility to Digital Wireless Telecommunications Summit Meeting held on Jan. 3, 1996, the internal wiring of the hearing aid acts as an antenna (or antennae) and the nonlinearity of the transistors in the amplifier stages (and in the FET preamplifier contained in the typical electret microphone) demodulates the "audio-band Morse code" modulation of the carrier. The harmonics of the 50 Hz or 217 Hz square wave modulation fall in the region of frequencies where the primary information in speech is carried, producing a masking noise. As demonstrated in a videotape prepared by the applicant and submitted to the conference, the result is often to make the cellular telephone unusable by the hearing-aid wearer.

At first, this problem was not widely noted, since digital service was not available in most areas and since all digital phones could be switched to analog, which has a continuous carrier that eliminates the audio interference. Hearing aid users who found themselves unable to communicate in the digital mode could simply switch to analog, which has a continuous carrier that eliminates the audio interference. Increasingly, however, analog service is being phased out in favor of digital service because of the larger number of users per allocated frequency that can be accommodated by digital service. Moreover, some of the newest digital phones use the European GSM version of TDMA, which does not permit analog (continuous carrier) operation but uses digital only operation where the carrier is switched at a rate of 217 times per second. Also, these new phones allow a higher level of emitted power.

At a BTE (Behind-the-ear) or ITE (full-size in-the-ear) hearing aid, the measured field strength generated by transmissions from a nearby hand-held cellular phone can be in the 3 V/m range when the hearing aid user is 1 meter away ("bystander" condition). When the cellular phone is to be used by the hearing aid wearer, however, the field strength seen by the hearing aid when the phone is brought to the ear can be in the 100–200 V/m range ("user" condition).

An informal estimate of the relative interference problems caused by the three digital phone schemes, GSM, TDMA, and Code Division Multiple Access (CDMA) is illustrated in FIG. 2. FIG. 2 shows a cartoon representation of the problem, likening the interference problem to that of driving over a road with spikes or speed bumps built in. Empirically, the worst interference is caused by the GSM system. In fact, the current driving force behind seeking a solution comes from the recent deployment of a pilot GSM system in the Washington, D.C. area.

It is possible to modify the design of such hearing aids so they become relatively immune to interference from 3 V/m "bystander" carrier strengths. Reports from engineers here and in Europe, however, indicate that it is impractical to reduce the sensitivity of many BTE and ITE hearing aid designs sufficiently to allow use of cellular phones. Many of these existing aids are intrinsically good designs from the audio and audiological standpoint, but use printed-circuit boards and hand wiring to the components and adjustment trimmers so that the minimum "antenna" size is still too large to allow adequate bypassing. Known shielding techniques, such as shielding the case with silver paint, may produce a 10–15 dB improvement. Also, it is known that bypassing each amplifier stage with a pi-filter may also provide incremental improvements. However, these approaches can only bring the effective immunity from perhaps 1–2 V/m to 10–20 V/m; still 20 dB shy of the needed immunity to the strong near field produced by digital wireless telephones held adjacent to the ear.

It is noted that In-the-Canal and Completely-in-the-Canal (CIC) aids presently in production are often completely immune to the 100–200 V/m field strengths generated by cellular telephones at the ear without special further effort. This comes about because of a combination of the shielding provided by the ear canal and the fact that their tiny size dictates use of integrated-circuit and hybrid designs where the wiring is necessarily so short that very little antenna length can exist. It is the approximately 1.5 million users of BTE hearing aids that is of primary concern of this invention, since many of these users have a hearing loss so severe that they must use BTE aids to obtain sufficient power and gain (requiring larger receivers than can fit in the canal) without feedback. Many of these users cannot hear the telephone output directly and must use their aids with the telephone.

Thus, there appears to be a need to bridge the 20–26 dB gap between the fully modulated 100–200 V/m strength of the present TDMA and GSM carriers and the perhaps 10 V/m immunity level that may be practical in BTE designs. In Europe, new hearing aids must only be immune to a 3 V/m field, enough immunity to prevent a nearby phone from interfering with a BTE hearing aid but not nearly enough immunity to allow the wearer of a BTE hearing aid to use a GSM or a United States TDMA phone.

The applicant has demonstrated empirically that CDMA does not present a significant interference problem under some conditions. However, the widespread deployment of CDMA cellular is still years away and a large installed base of TDMA cellular equipment is expected to exist for many years to come. There is a need, therefore, to make the existing cellular infrastructure compatible and accessible to the wearers of the millions of hearing aids currently in the field.

SUMMARY OF THE INVENTION

Accordingly, one feature of my invention is a method of reducing interference that allows existing digital cellular telephones to be used with existing hearing aids with only minor modifications to the telephone equipment.

Another feature of my invention is to provide a low power, near field effect which effectively cancels the interfering near field.

Another feature of my invention is a method of switching the switched carrier to a "garbage" frequency when the cellular telephone is not transmitting in its time slot so that to the hearing aid, the switched carrier effect is eliminated.

Another object of my invention is to provide an apparatus for a BTE hearing aid that will allow the wearer to "null" the interfering near field seen by the audio amplifier.

BRIEF DESCRIPTION OF THE DRAWINGS

FIG. 2 is an illustrative rendering of how various digital transmission schemes cause interference with hearing aids.

FIG. 3 is an illustrative rendering of how the interference problem could be solved if the interruptions in the carrier were "filled in" with carrier transmission.

FIG. 6A shows how a local antenna can be used to eliminate interference from a digital cellular telephone.

FIG. 6B shows how an interference detector cancels the interference of a digital cellular telephone.

FIG. 7 shows an interference detector circuit that can be used with one embodiment of the invention.

DETAILED DESCRIPTION OF THE PREFERRED EMBODIMENTS

Since the interference problem is caused by the interruption of the carrier (continuous-carrier analog cellular phones typically cause little interference), it appears that the situation would be improved if the near-field appearance of switched transmission could be filled in some way. This is illustrated in FIG. 3. The carrier is on during time slots 20 which creates a "hum" in hearing aids used with digital cellular phones.

One preferred technique is to not turn off the carrier, but move the carrier frequency to a "garbage" unused frequency or other frequency allocated for this purpose. The gaps between time slots 20 are filled in by transmission of the garbage carrier 31 whenever the time slots 20 are not transmitted. Since the demodulation process is relatively insensitive to the carrier frequency, this has the advantage of nearly perfect immunity at the expense of a 3–8 times increase in the power drain attributable to the transmitter output-stage, depending on whether the transmitter had been operating one-third or one-eighth the time in the digital-only mode. The penalty in battery life is not as severe as it first may appear, however, since the additional processing required by the digital techniques is a substantial component of the overall power budget and is unaffected by the transmitter output stage. Thus the increase in battery drain by switching the carrier to a "garbage" frequency 31 with the proposed solution may not appear as a substantial penalty. Furthermore, invoking the fill-intransmission feature would preferably be under user control, so only those users needing to reduce interference would experience higher battery drain. For hearing aid wearers and in the applicant's experience, this would be a welcome tradeoff.

Figure 1:
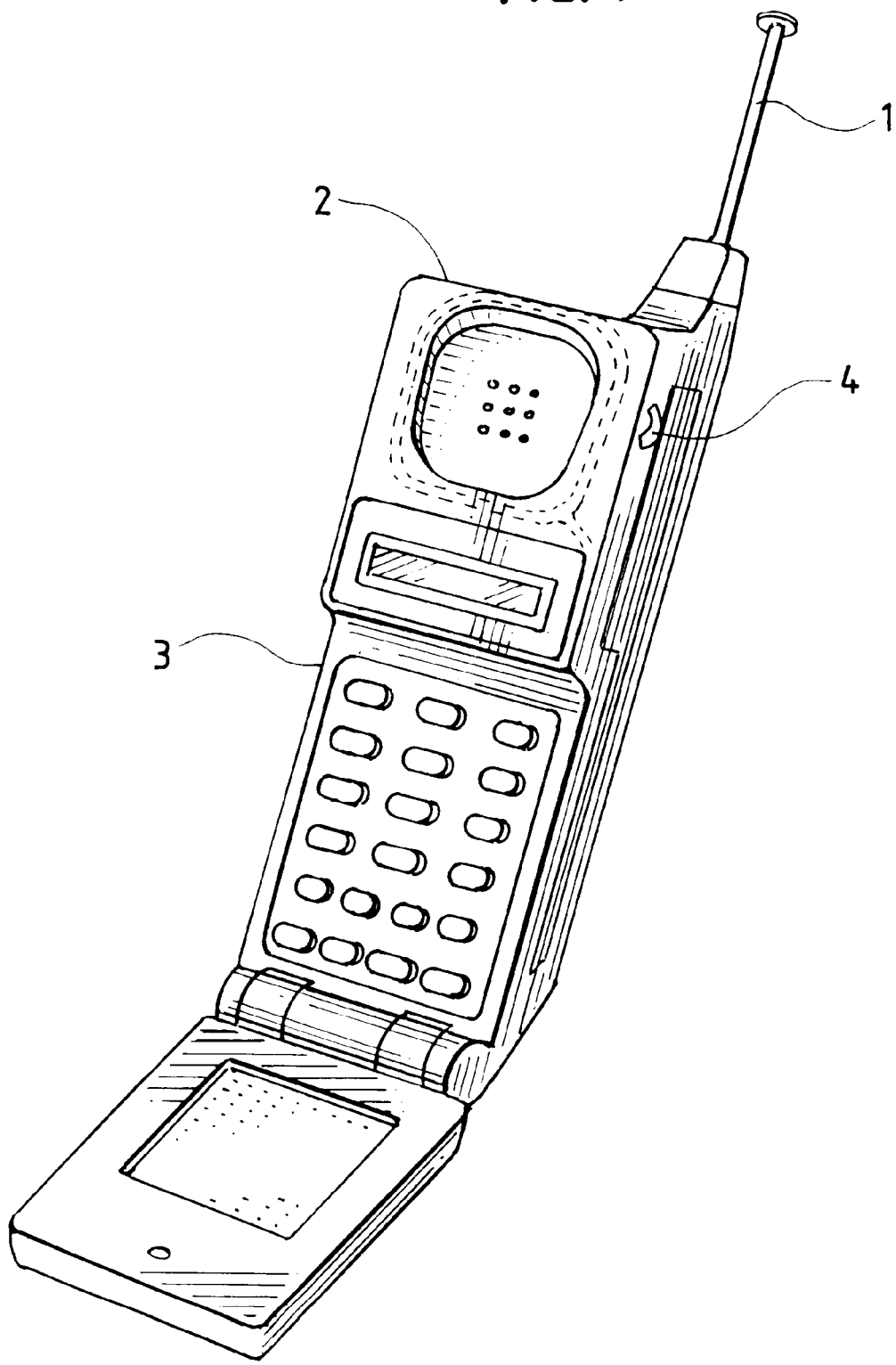
FIG. 1 is a rendering of a typical cellular telephone of a type commonly sold today, which is capable of being used in both digital and analog modes, and which includes a local antenna in accordance with the present invention.
Figure 4:
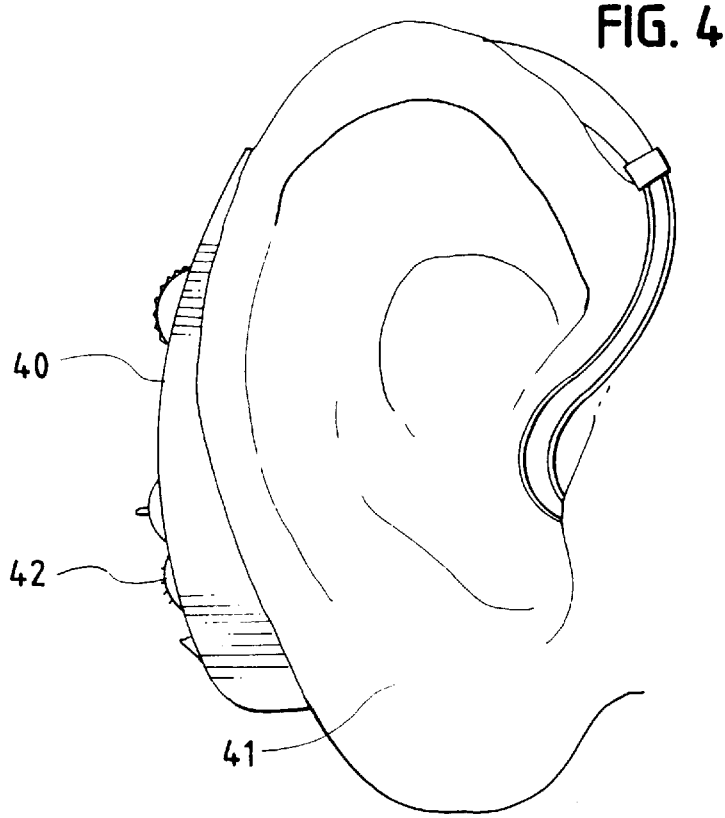
FIG. 4 shows a typical Behind The Ear (BTE) hearing aid.

Another preferred technique for accomplishing a transmission "fill-in" carrier while not interfering with the operation of the TDMA system and conserving battery power can be accomplished as follows. The cellular telephone of FIG. 1 has a main antenna 1 for communication with the public telephone network which transmits an information signal on a selected switched carrier frequency in accordance with the applicable TDMA standard. A second, local antenna 2 (shown as a dashed line) is placed around the earpiece of the cellular phone 3. This local antenna 2 may be a loop antenna or some other shape of antenna of suitable size which exhibits directionality. Preferably, the local antenna 2 is oriented so that the primary near field antenna pattern results in a peak energy delivered to the hearing aid 40. When the phone 3 is transmitting in its time slot, the local antenna 2 is not energized. Between time slots, the phone 3 energizes the local antenna 2 with the carrier frequency. The power in the local antenna 2 is set such that the near field generated by the local antenna at the hearing aid 40 is equal to the near field generated by the main antenna 1 at the nominal orientation of the phone to a typical user's ear 41. Because the local antenna 2 can be both directional and relatively much closer to the typical location of a BTE hearing aid 40, the power fed to the local antenna 2 can be much less.

The selected power level fed to the local antenna 2 is appropriately a fixed fraction of the power currently being radiated by the main antenna 1. As the power transmitted by the main antenna 1 fluctuates, both in response to the changing demands of the cellular transmission link protocol and with decreased battery strength, the power transmitted by the local antenna 2 fluctuates proportionally. Thus, the local antenna 2 transmits a relatively low-power signal 61, which has no information content and does not interfere with the cellular service, whenever the main antenna 1 is not transmitting a carrier wave 60, as in those periods between time slots 20. By precisely setting the relative power fed to the main antenna 1 and the local antenna 2 and controlling the orientation of the local antenna 2, interference can be tuned out by the user by appropriately positioning the cellular telephone in relation to the user's ear. The result thus achieved for the hearing aid circuit is shown in FIG. 6A.

An alternative to the foregoing is to generate the low power carrier at a totally different frequency such as 1 MHZ or 5 GHz, coupled to the local antenna 2 around the earpiece of the cellular phone. When the main carrier 60 is shut off, the low power carrier 61 is turned on as a low-power near-field source. Provided the maximum available near-field signal seen at the hearing aid was as great or greater than the carrier signal 60 seen at the hearing aid 40, the user could undoubtedly quickly adjust the low power carrier to local quality by "nulling" the audio interference with an interference trimmer. A thumb-adjustable "window" over the local antenna, or a voltage control 4 of the local power could be used for audible nulling, for example.

Another embodiment involves building a feedback nulling mode into the cellular phone itself. The cellular phone 3 can sense its hearing-aid-side RF output and balance the local carrier 61 with the main carrier 60 to minimize the difference between the near-field signal strengths. Again, the this can be accomplished by making the local antenna 2 directional and placing it as close to the ear as possible.

Figure 5:
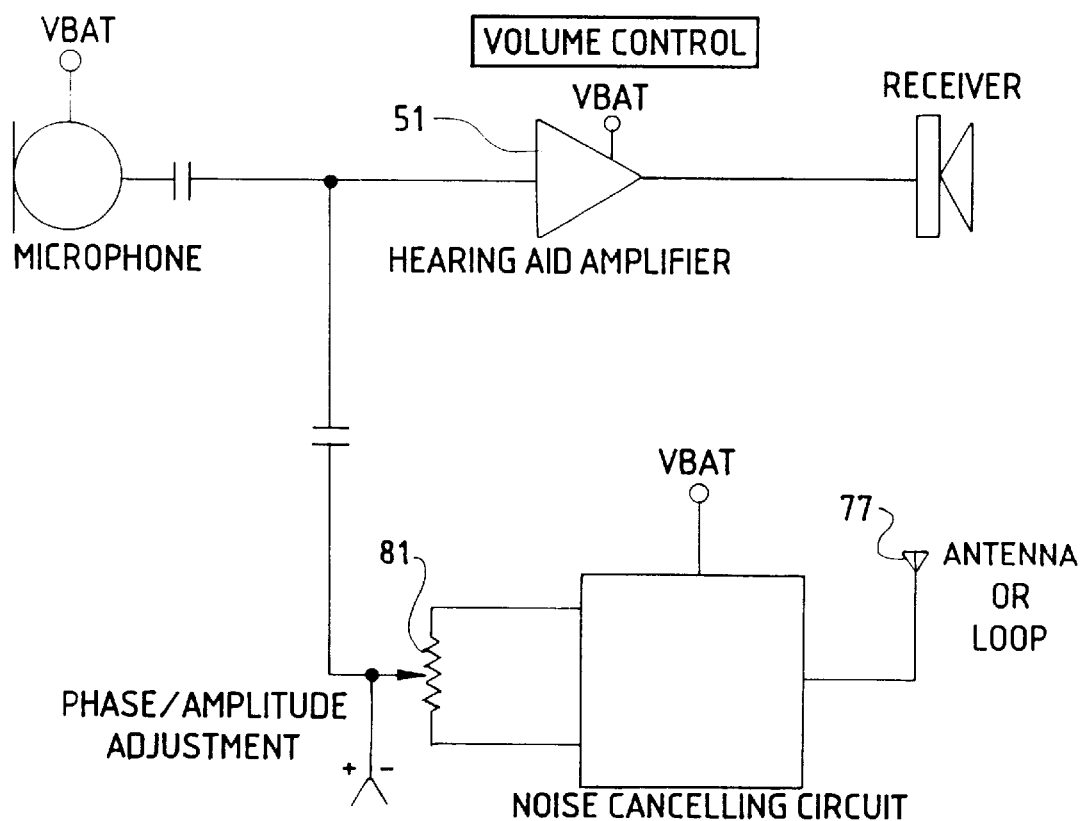
FIG. 5 shows a block diagram of a digital telephone noise canceling system in accordance with this invention.

Yet another embodiment focuses on the hearing aid itself. FIG. 5 shows a block diagram of such a hearing aid. FIG. 6B shows the operation of the circuit. The hearing aid 40 is provided with an internal RF sensor that drives a nulling bias shift 62 equal but opposite to the demodulated bias shift 63 that occurs in the input stage of the amplifier. (FIG. 5). The result is a nearly perfect cancellation signal 64. A circuit (FIG. 7) is provided which detects the presence of an RF digital cellular information signal and generates a corresponding demodulated signal at the same switched carrier frequency. This signal is inverted and its amplitude is adjusted to match that of the interfering demodulated digital switched carrier signal 63. The appropriate amount of nulling signal inject may be set at the factory. Alternatively, a hand-held "null" adjustment 42 may be provided for the user to allow the wearer to determine just how much bias shift to introduce. This bias shift is then introduced into the input stage of the audio amplifier in the hearing aid 40 to cancel the demodulated interfering switched carrier signal.

Figure 8:
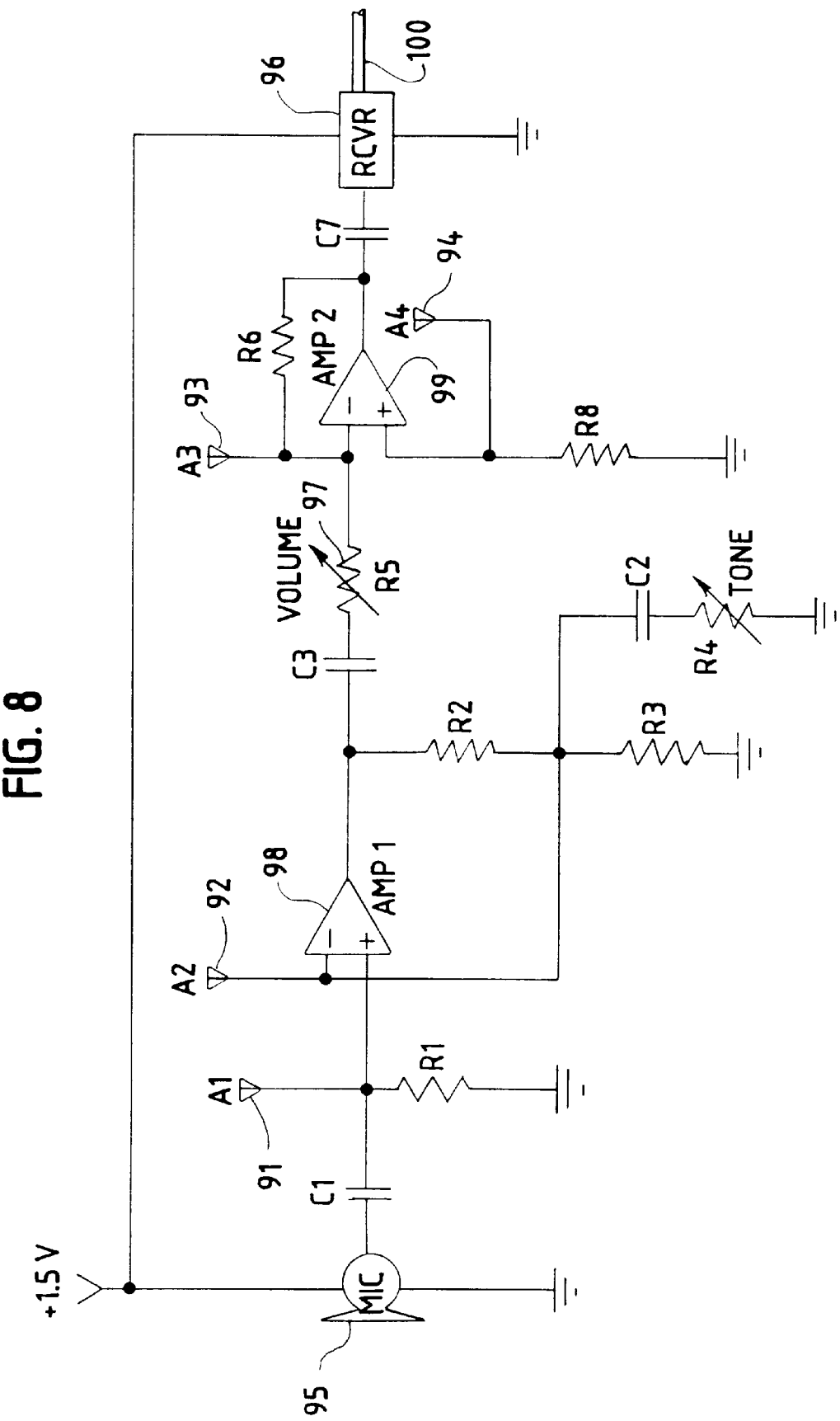
FIG. 8 shows an alternative circuit that allows a hearing aid circuit to suppress interference with the addition of additional compensating antennas.

FIGS. 7 and 8 show two variations of the RF detection and null adjustment circuit of the invention. The circuit of FIG. 7 is comprised of: A peaking current source Q1 and Q2 (71 and 72) which powers Q3 (73) creating the base-emitter bias voltage for detector Q4. A transistor Q4 (74) acts as a detector diode and amplifier. A phase splitter 78 accepts the amplified detected noise modulation from Q4 (74) and creates two signals (75, 76) one 180 degrees out of phase from the other. By simple adjustment of a potentiometer 81 connected across these two out of phase signals, a signal may be derived of the proper amplitude and phase to cancel the digital cellular telephone generated noise. This signal is introduced into the interfered apparatus at the input to the audio amplifier 51.

The NPN transistor Q4 (74) has a short wire 77 or loop 80 attached to its base to act as an antenna to pick up the 800–2000 MHZ radio signal originating from a digital telephone. This wire 77 or loop 80 is of a size to be incorporated on a small integrated circuit, 0.05 to 0.1 inches in length. The base of Q4 (74) detects the interfering signal and this demodulated signal is amplified at the collector of Q4 (74). The parasitic capacitances of Q4 (74) are sufficient to filter the UHF signal. The demodulated and amplified signal is introduced to phase splitter Q5 (78) where two out of phase but similar signals are produced. A potentiometer 81 is connected across these out of phase signals. By simple adjustment of this potentiometer 81 the proper polarity and amplitude signal may be derived which, when introduced into the audio amplifier 51, will cancel the effects of the received digital cellular telephone signal 63.

An alternative to providing a separate cancellation circuit in the BTE hearing aid is to provide a demodulating antenna input directly to the hearing aid circuit. In this way, an out-of-phase demodulating input can be obtained from a second circuit in the existing hearing aid circuit. By adding a short antenna to couple the interfering RF signal into the second circuit, and adjusting the amount of coupling so that the out-of-phase demodulated audio equals the in-phase demodulated audio interference already present, cancellation of the audio interference may be obtained.

An example of such a circuit is shown in FIG. 8. The hearing aid amplifier uses a differential input stage, such as employed in a widely used "K-AMP" amplifier. The K-AMP circuit is fully described in U.S. Pat. No. 5,131,046 to Killion, et. al, the disclosure of which is incorporated herein by reference. In FIG. 8, a simplified K-AMP circuit is shown. A microphone 95 picks up sound waves to be amplified. The signal generated by microphone 95 is amplified by a first stage amplifier 98 and again by a second stage amplifier 99. A receiver 96 provides an amplified, audio output that is fed to the user's ear by an ear tube 100. When a digital cellular telephone is brought into close proximity of the circuit in FIG. 8, the components of the circuit act as antennas to demodulate the switched digital carrier as described above. These parasitic antennas are schematically represented as parasitic antennas 91 and 93.

In the K-AMP circuit of FIG. 8, the inverting and non-inverting inputs of amplifiers 98 and 99 tend to be well matched. By coupling a comparable RF signal level into both the inverting and non-inverting inputs a cancellation of the resulting in-phase and out-of-phase demodulated audio signals will result, and the output of the amplifier will be substantially free of interfering demodulated audio signal. To accomplish this objective, a compensating antenna 92 designed to demodulate the interfering digital cellular telephone carrier wave with a signal level approximately equal to the naturally present parasitic demodulated signal produced by the parasitic antenna 91 can be added to the inverting input of first stage amplifier 98. Depending on the specific circuit layout, an additional compensating antenna 94 may be advantageously added to the inverting input of second stage amplifier 99. This second stage compensating antenna may be necessary if the parasitic antenna effects of, for example, volume control 97 are audible. Schematically, the parasitic effects, if any, present in the second stage are represented as being produced by parasitic antenna 93.

Even if the amplifier of a BTE hearing aid is not of the differential type, the above technique can still be used in a two-stage amplifier by adding a strongly coupled compensating antenna to the input of the second stage. The coupling of the compensating antenna must by strong enough to approximately equal the audio gain of the first stage; i.e., if the gain of the first stage is 5, the resulting demodulated audio produced at the input to the second stage by the compensating antenna must be 5 times greater than the demodulated audio produced by parasitic effects at the input to the first stage.

We claim:

1. A method of reducing cellular telephone interference with a hearing aid, comprising the steps of:
    detecting the presence of a digital cellular information signal,
    demodulating said signal at the frequency at which the digital cellular information signal is being switched,
    generating a signal which is the inverse of said demodulated digital cellular information signal,
    adjusting the amplitude and phase of said inverted signal so that it is equal in phase and opposite in magnitude to said demodulated switched RF carrier, and
    applying said inverted signal to the audio input stage of the amplifier of said hearing aid.

2. A hearing aid comprising:
    an antenna configured to receive a digital cellular information signal;
    a noise-canceling circuit coupled to said antenna, said noise-canceling circuit adapted to:
        demodulate said digital cellular information signal at the frequency at which said digital cellular information signal is being switched to produce a demodulated digital cellular information signal;

invert said demodulated digital cellular information signal to produce an inverted demodulated digital cellular information signal; and adjust the amplitude and phase of said inverted demodulated digital cellular information signal so that it is equal in phase and opposite in magnitude to said demodulated digital cellular information signal to produce a canceling signal;

a microphone, said microphone producing an auditory input signal; and an amplifier coupled to said noise-canceling circuit and said microphone, said amplifier adapted to combine said canceling signal and said auditory input signal to produce an amplified output signal.

3. The hearing aid of claim 2, wherein the noise-canceling circuit further comprises a manual phase-amplitude adjuster.

* * * * *